United States Patent
March Nomen et al.

(10) Patent No.: US 10,330,075 B2
(45) Date of Patent: Jun. 25, 2019

(54) WIND TURBINE BLADE COMPRISING A LIGHTNING PROTECTION SYSTEM EQUIPPED WITH RADAR ABSORBING MATERIAL

(71) Applicant: GAMESA INNOVATION & TECHNOLOGY, S. L., Sarriguren (Navarra) (ES)

(72) Inventors: Victor March Nomen, Sarriguren (ES); Juan Madoz Zabalegui, Sarriguren (ES)

(73) Assignee: SIEMENS GAMESA RENEWABLE ENERGY INNOVATION & TECHNOLOGY, S.L, Sarriguren (Navarra) (ES)

( * ) Notice: Subject to any disclaimer, the term of this patent is extended or adjusted under 35 U.S.C. 154(b) by 201 days.

(21) Appl. No.: 15/337,838

(22) Filed: Oct. 28, 2016

(65) Prior Publication Data
US 2017/0145988 A1 May 25, 2017

(30) Foreign Application Priority Data
Nov. 24, 2015 (ES) .................................. 201500840

(51) Int. Cl.
*F03D 1/06* (2006.01)
*F03D 80/30* (2016.01)

(52) U.S. Cl.
CPC ........... *F03D 1/0675* (2013.01); *F03D 80/30* (2016.05); *F05B 2260/99* (2013.01); *F05B 2280/6003* (2013.01); *Y02E 10/721* (2013.01)

(58) Field of Classification Search
CPC .. F03D 1/06–0675; F03D 80/30; F03D 80/10; F05B 2260/99
See application file for complete search history.

(56) References Cited

U.S. PATENT DOCUMENTS

| | | | |
|---|---|---|---|
| 9,194,365 B2 * | 11/2015 | Appleton | F01D 11/00 |
| 2010/0329881 A1 * | 12/2010 | Mendez Hernandez | F01D 11/00 416/230 |
| 2012/0207612 A1 | 8/2012 | Fixter et al. | |
| 2013/0177436 A1 * | 7/2013 | Baucke | F03D 1/0675 416/232 |
| 2013/0294925 A1 * | 11/2013 | Appleton | B29C 70/086 416/241 R |

(Continued)

FOREIGN PATENT DOCUMENTS

| WO | 2010/122350 A1 | 10/2010 | |
| WO | WO 2011080177 A1 * | 7/2011 | ........... F03D 1/0641 |
| WO | 205/061670 A1 | 4/2015 | |

*Primary Examiner* — Kenneth Bomberg
*Assistant Examiner* — Andrew Thanh Bui
(74) *Attorney, Agent, or Firm* — Ladas & Parry LLP

(57) ABSTRACT

The invention provides a wind turbine blade having a Radar Absorbing Material (RAM) and a lightning protection system arranged for guaranteeing the performance of the lightning protection system and the integrity of the RAM. The lightning protection system has lightning receptors located at a tip region and one or two down-conductors disposed inside of the wind turbine blade for driving lightning current to ground. The RAM covers the entire wind turbine blade except the tip region and has at least a functional layer and a reflector layer connected to the one or two down conductors by means of auxiliary cables.

17 Claims, 4 Drawing Sheets

(56) References Cited

U.S. PATENT DOCUMENTS

2014/0118177 A1* 5/2014 Appleton .............. F03D 1/0675
  342/1
2015/0377217 A1* 12/2015 Sandercock .......... B29C 70/885
  416/230

* cited by examiner

WIND TURBINE BLADE COMPRISING A LIGHTNING PROTECTION SYSTEM EQUIPPED WITH RADAR ABSORBING MATERIAL

BACKGROUND OF THE INVENTION

The inclusion of Radar Absorbing Material (RAM) into composite blades of wind turbines to reduce its radar reflectivity so that they do not interfere with radar systems such as air traffic control systems, weather or marine radar systems is known.

WO 2010/122350 A1 describes a combined prepreg material comprising first and second layers impregnated with a matrix material such as a resin to be used particularly in wind turbine blade. The first layer is a functional layer of RAM and the second layer is a keying layer that comprises a keying medium to facilitate bonding of the combined prepreg material to a gel coat.

U.S. 2012/0207612 A1 discloses a wind turbine blade that includes a multilayer composite structure including a first reflective layer and a second layer with a plurality of resistive circuit analogue (CA) elements. The CA elements are tuned so as to interact with said first layer to provide absorption of electromagnetic (EM) energy over a desired frequency range. The parameters of the CA elements can be varied to provide for frequency tuning and to maintain absorption at a specific frequency range despite varying layer separation, while at the same time ensuring that the mechanical properties of the CA layer are compatible with integration into the turbine blade.

WO 2015/061670 A1 discloses a suitable composite laminate for wind turbine blades for the attenuation of the reflection of electromagnetic radiation in the S or X bands up to a peak of −20 dB. The composite laminate comprises particularly one or more functional layers having a printed circuit for absorbing the electromagnetic radiation incident on the composite laminate and a conducting layer.

None of said patent applications mentions any relation between RAM and lightning protection.

U.S. 2014/0118177 A1 discloses a wind turbine blade wherein the RAM includes a ground plane having an electrical conductivity and/or a dielectric constant that is higher in the presence of an electric field having a frequency of 1 GHz and above than in the presence of an electric field having a frequency of 10 MHz and below. The ground plane can be tuned to be highly reflective at radar frequencies and benign at lightning discharge frequencies.

BRIEF DESCRIPTION OF THE INVENTION

The invention provides a wind turbine blade having RAM and a lightning protection system that are arranged for guaranteeing the performance of the lightning protection system and the integrity of the RAM. The lightning protection system comprises lightning receptors located at a tip region located between the end of the blade and a cross section at a radius R having a length ranging from 80-90% of the length of the blade and one or two down-conductors disposed inside of the wind turbine blade for driving lightning current to ground. The RAM covers the entire wind turbine blade except the tip region and comprises at least a functional layer and a reflector layer in the laminate of each shell of the wind turbine blade. The reflector layers are connected to the one or two down conductors in at least two cross sections at radiuses R1, R2 having a length ranging, respectively, from 0-20% and 80-90% of the length of the blade by means of auxiliary cables.

In an embodiment the section of the down-conductor between two pairs of auxiliary cables is removed.

In an embodiment the wind turbine blade further comprise caps made of carbon fiber composite material whether in inner areas of shells or in blade beams that also connected to the auxiliary cables. If wind turbine blade would comprise caps made of fiber glass composite material would not be connected to the auxiliary cables.

Advantageously, the reflector layers are metallic meshes made of one of the following materials: copper, brass, aluminum, steel, stainless steel.

Advantageously the reflector layers and the caps made of carbon fiber composite material comprise first and second terminals (such as metallic brackets) embedded into the composite laminate of the shells of the wind turbine blade to facilitate its connection to the auxiliary cables.

In a first embodiment, the external layer of the laminate of the shells is a functional layer.

In a second embodiment, the laminate of the shells comprises at least a functional layer and a reflector layer embedded into layers of a glass fiber composite material.

In a third embodiment, the laminate of the shells comprises two functional layers and a reflector layer embedded into layers of a glass fiber composite material.

Other characteristics and advantages of the present invention will be clear from the following detailed description of embodiments illustrative of its object in relation to the attached figures.

DETAILED DESCRIPTION OF THE INVENTION

As noted in the Background, the laminate of the shells of a wind turbine blade formed by layers of composite material shall incorporate as Radar Absorbing Material (RAM) one or more functional layers with specific characteristics of resistivity and a conductive reflector layer to avoid that they reflect incident electromagnetic emissions from radar systems.

Composite layers are made up of resin materials and fibers with high mechanical properties that form hard sheets attached to each other after curing providing the required mechanical strength (hardness, tensile strength, etc.). The composite layers may comprise glass fiber or carbon fiber cloths and epoxy or polymeric resin. They may also comprise other fibers such as aramids, basaltic fibers or boron fibers as well as polymeric resins such as polyesters or vinyl esters.

The patent documents mentioned in the Background describe various alternatives for the functional layers and the reflector layer. For example WO 2015/061670 discloses a functional layer made up of glass fibers and conducting ink (carbon based) and a reflector layer that can be a sheet, mesh or foil made up of aluminum, copper or carbon.

Figure 1A:
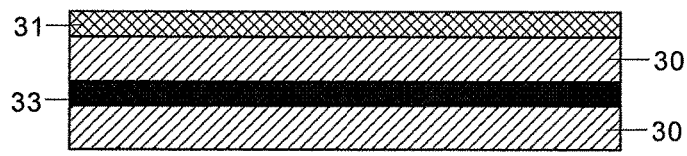
FIGS. 1a, 1b and 1c are schematic cross sectional views of three embodiments of a composite laminate of a wind turbine blade shell with Radar Absorbing Material.
Figure 1B:
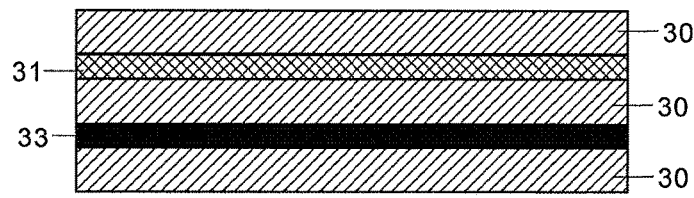
Figure 1C:
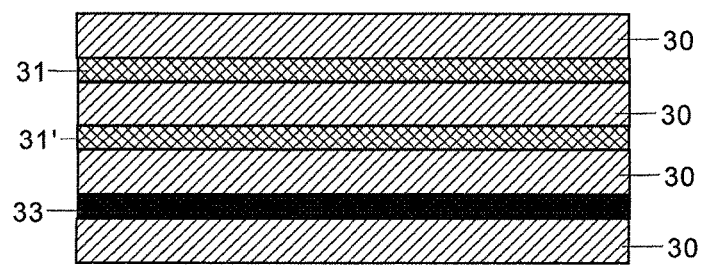

Regarding the arrangement of the mentioned layers in the laminate of wind turbine blade shells according to the present invention are particularly included laminates with a functional layer as the outer layer 31 of the laminate and a reflector layer 33 embedded between layers 30 of a composite material of, preferably, glass fiber (see FIG. 1a), laminates with a functional layer 31 and a reflector layer 33 embedded between layers 30 of a composite material of, preferably, glass fiber (see FIG. 1b) and laminates with two functional layers 31, 31' and a reflector layer 33 embedded between layers 30 of a composite material of, preferably, glass fiber (see FIG. 1c).

The laminate of the wind turbine shells may also include a coating (not shown in the Figures) of a suitable material to protect it from erosion and other damage caused by atmospheric agents such as wind and rain.

Figure 2A:
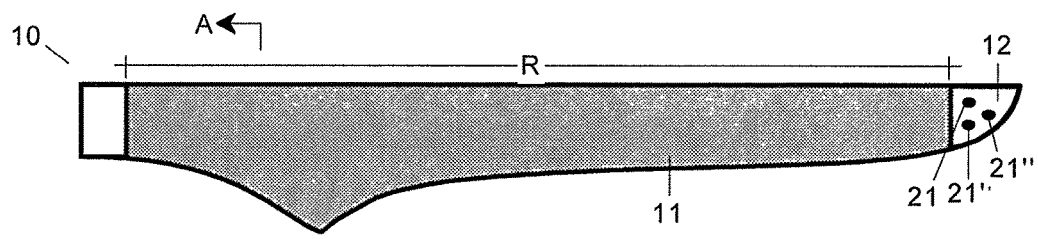
FIGS. 2a and 2b are a schematic plan and a cross sectional view of a wind turbine blade having shells of a composite material including Radar Absorbing Material and a lightning protection system according to the invention.
Figure 2B:
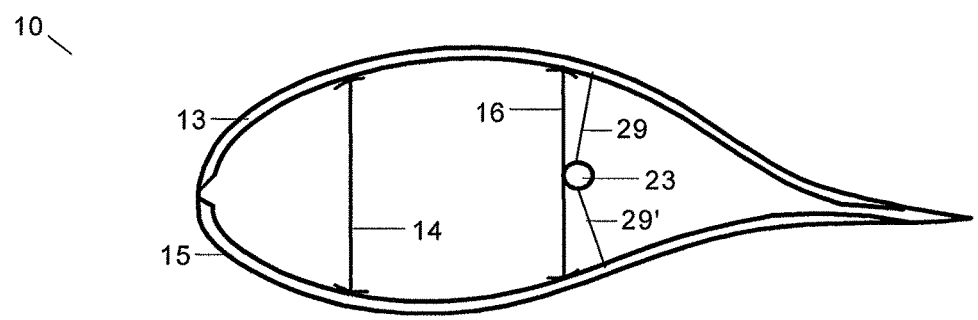

In order to avoid that RAM may be damaged by lightning, the invention proposes, firstly, separating clearly a first part 11 of the wind turbine blade 10 that incorporates RAM from a second part 12 that includes the lightning receptors 21, 21', 21" in a tip region extended from a radius R having a length comprised between the 80-90% of the length of the wind turbine blade until the end of the blade and, secondly, connecting the reflector layers 33 (embedded in the composite laminates of shells 13, 15) to a down-conductor 23 (or two down-conductors 23, 23' joined to the spars 14, 16 of the blade) of the lightning protection system of wind turbine blade 10 that drives to around the currents received by lightning receptors 21, 21', 21" by means of auxiliary cables 29, 29' that equipotentialize the reflector layers 33 of shells 13, 15 and the down-conductor 23 (see FIGS. 2a, 2b).

The functional layers 31, 31' of shells 13, 15 are not connected to the down-conductor 23 or down-conductors 23, 23' because they have a very low portion of metallic material and consequently the risk of being damaged by any lightning current flow is very low. In many embodiments the functional layers 31, 31' comprise metallic elements not connected between them so that they are not conductive layers.

The invention is applicable to wind turbine blades 10 with reflector layers 33 made of any conducting material and particularly applicable to wind turbine blades 10 having a metallic mesh made of copper, brass, aluminum, steel or stainless steel as reflector layers 33. The distance between a reflector layer 33 and a functional layer 31 or 31' may be between 0.3-40 mm.

Figure 3A:
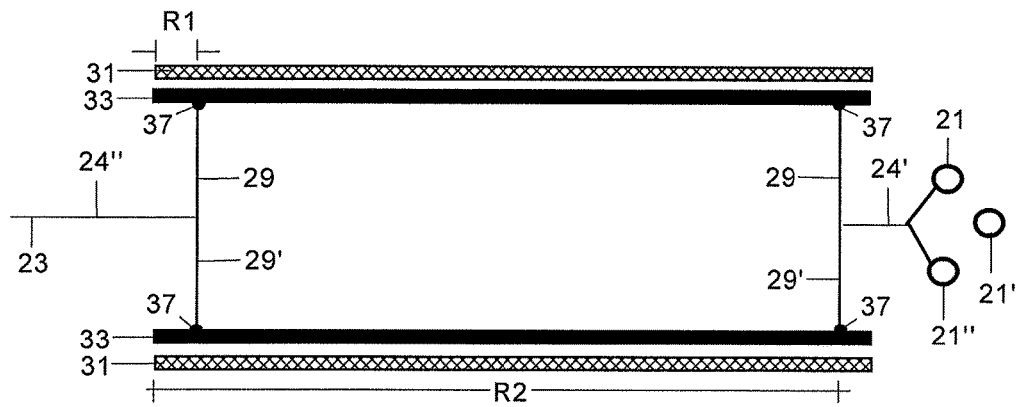
FIGS. 3a, 3b, 3c and 3d are schematic diagrams illustrating the lightning protection of the Radar Absorbing Material of the wind turbine blade in four embodiments of the invention.

In the embodiment illustrated in FIG. 3a the reflector layers 33 of shells 13 and 15 are connected through two pairs of auxiliary cables 29, 29' in cross-sections at radiuses R1, R2 having respectively lengths comprised between 0-20% and 80-90% of the length of the blade to a first section 24' of the down conductor 23 in the tip region and to a second section 24" from the second pair of auxiliary cables 29, 29' to its ground connection.

Figure 3B:
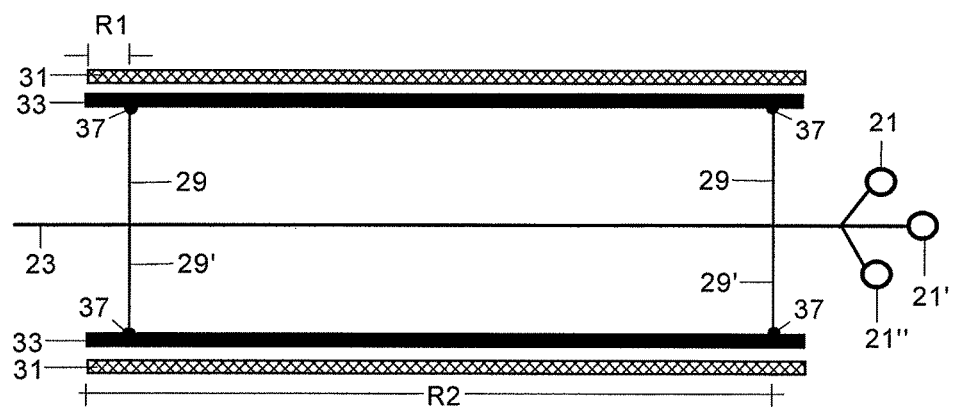

In the embodiment illustrated in FIG. 3b the reflector layers 33 of shells 13 and 15 are equipotentialized with a down-conductor 23 through two pairs of auxiliary cables 29, 29' in cross sections at radiuses R1, R2 having, respectively lengths comprised between 0-20% and 80-90% of the length of the blade.

Figure 3C:
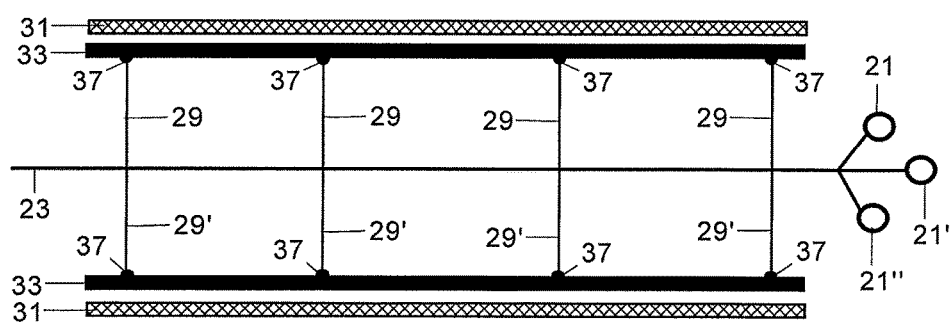

In the embodiment illustrated in FIG. 3c the reflector layers 33 of shells 13 and 15 are equipotentialized with a down-conductor 23 through two pairs of auxiliary cables 29, 29' in cross-sections at radiuses R1, R2 having, respectively lengths comprised between 0-20% and 80-90% of the length of the blade and through two additional pairs of auxiliary cables 29, 29' in cross sections at intermediate radiuses between R1 and R2.

Figure 3D:
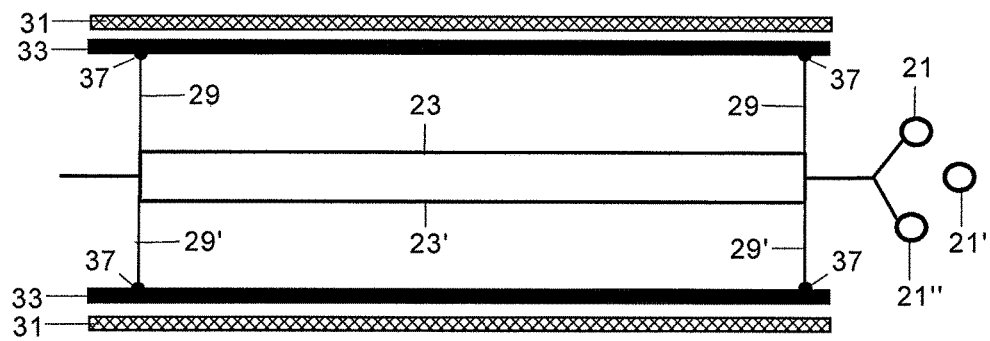

In the embodiment illustrated in FIG. 3d the reflector layers 33 of shells 13 and 15 are equipotentialized with two down-conductors 23, 23' through two pairs of auxiliary cables 29, 29' in cross sections at radiuses R1, R2 having, respectively lengths comprised between 0-20% and 80-90% of the length of the blade.

Figure 4A:
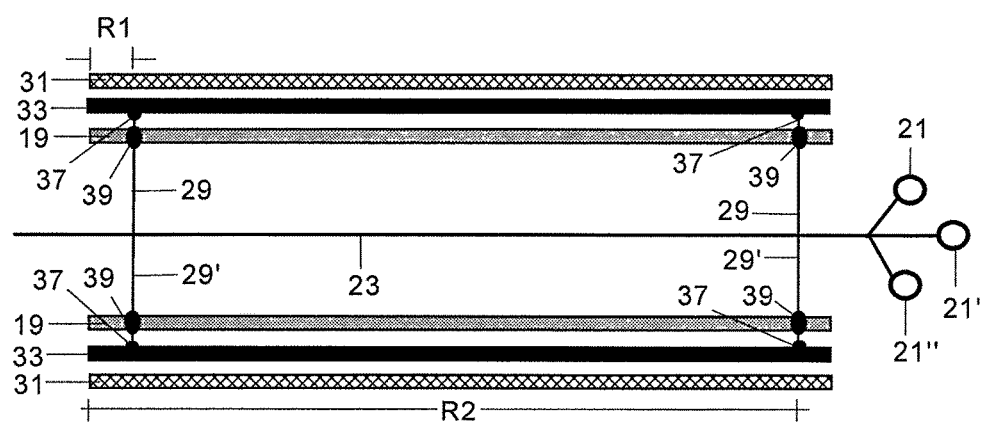
FIGS. 4a-4b and 5a-5b are a schematic diagram and a cross sectional view of a wind turbine blade that includes caps of carbon fiber composite material illustrating two embodiment of the lightning protection of the Radar Absorbing Material.
Figure 4B:
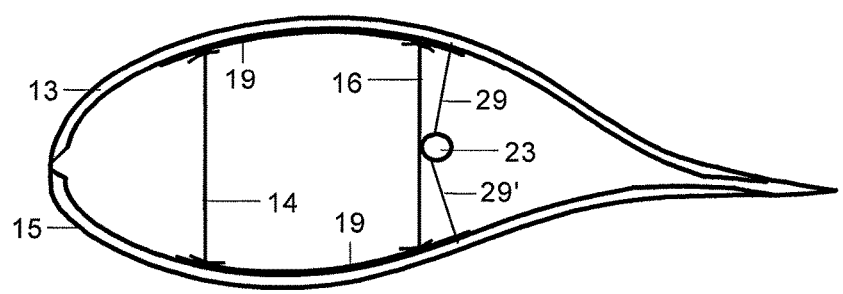

In the embodiment illustrated in FIGS. 4a and 4b the shells 13 and 15 also comprise caps 19 of carbon fiber composite material in their inner areas that, as the reflector layers 33, are equipotentialized with a down-conductor 23 through two pairs of auxiliary cables 29, 29' in cross sections at radiuses R1, R2 having, respectively lengths comprised between 0-20% and 80-90% of the length of the blade.

Figure 5A:
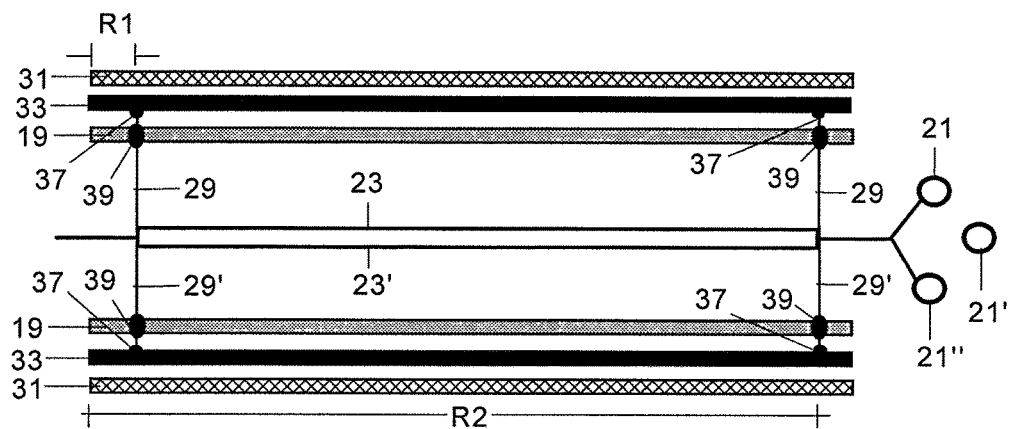
Figure 5B:
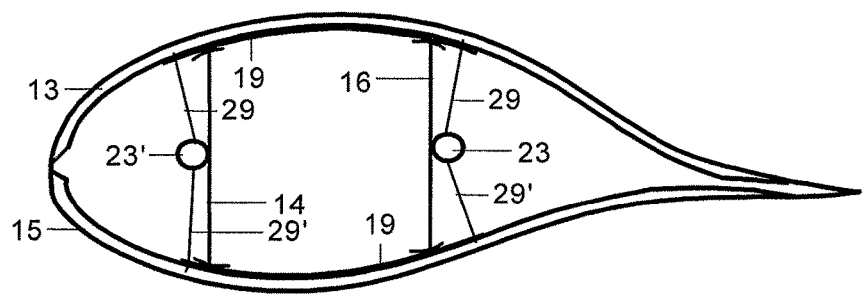

In the embodiment illustrated in FIGS. 5a-5b the shells 13 and 15 also comprise caps 19 of carbon fiber composite material in their inner areas that, as the reflector layers 33, are equipotentialized with the down-conductors 23, 23' through two pairs of auxiliary cables 29, 29' in cross sections at radiuses R1, R2 having, respectively lengths comprised between 0-20% and 80-90% of the length of the blade.

As illustrated in FIGS. 3a-3c, 4a and 5a the reflector layers 33 are provided with terminals 37 (typically metallic brackets) that remain embedded in the composite laminate of shells 13, 15 to facilitate its connection with the auxiliary cables 29, 29'. Similarly the caps 19 illustrated in FIGS. 4a, 5a are provided with suitable terminals 39.

The main advantage of the invention is that guarantee the performance of the lightning protection system of the wind turbine blade 10 and the integrity of the Radar Absorbing Material after a lightning strike allowing therefore the installation of wind turbines in sites close to airports, weather radars and other radar emitting locations.

Although the present invention has been described in connection with various embodiments, it will be appreciated from the specification that various combinations of elements, variations or improvements therein may be made, and are within the scope of the invention.

The invention claimed is:

1. A wind turbine blade (10) comprising a lightning protection system and shells (13,15) made of a composite material including Radar Absorbing Material; the lightning protection system comprising one or more lightning receptors (21, 21', 21") and one or two down-conductors (23, 23') disposed inside of the wind turbine blade (10) for driving lightning current to ground; the Radar Absorbing Material comprising at least a functional layer (31) and a reflector layer (33) in a laminate of the shells (13, 15); characterized in that:
   the Radar Absorbing Material covers the entire wind turbine blade (10) except a tip region (12) located between an end of the blade and a cross section at a radius R having a length ranging from 80-90% of a length of the wind turbine blade;
   the lightning receptors (21, 21', 21") are located at the tip region (12);

the reflector layer (33) of each of the shell (13, 15) is connected to the one or two down conductors (23, 23') in at least two cross sections at radiuses R1, R2 having a length ranging, respectively, from 0-20% and 80-90% of the length of the blade by means of auxiliary cables (29, 29').

2. The wind turbine blade (10) according to claim 1, wherein the reflector layer (33) of each of the shell (13, 15) is connected by two pairs of the auxiliary cables (29, 29') to two sections (24', 24") of one of said one or two down conductor (23), a first section (24') of the two sections being arranged in the tip region of the wind turbine blade up to a connection between the first section (24') and A first pair of the two pairs of the auxiliary cables (29, 29') and a second section (24") of the two sections being arranged from a connection between the second section (24") and a second pair of the two pairs of the auxiliary cables (29, 29') up to a ground connection.

3. The wind turbine blade (10) according to claim 1, further comprising caps (19) made of carbon fiber composite material that are also connected to the auxiliary cables (29, 29').

4. The wind turbine blade (10) according to claim 3, wherein the caps (19) are arranged in inner areas of the shells (13, 15).

5. The wind turbine blade (10) according to claim 3, wherein the caps (19) are arranged in blade beams.

6. The wind turbine blade according to claim 1, wherein the reflector layer (33) of each of the shells (13, 15) comprises a metallic mesh made of one of the following materials: copper, brass, aluminum, steel, and stainless steel.

7. The wind turbine blade (10) according to claim 1, wherein the reflector layer (33) of each of the shells (13, 15) is a layer of carbon fiber composite material.

8. The wind turbine blade (10) according to claim 1, wherein the reflector layer (33) of each of the shells (13, 15) comprises first terminals (37) for a connection between the reflector layer (33) of each of the shells (13, 15) and the auxiliary cables (29, 29').

9. The wind turbine blade (10) according to claim 8, wherein the first terminals (37) are metallic brackets.

10. The wind turbine blade (10) according to claim 3, wherein the caps (19) comprise second terminals (39) for a connection between the caps (19) and the auxiliary cables (29, 29').

11. The wind turbine blade (10) according to claim 10, wherein the second terminals (39) are metallic brackets.

12. The wind turbine blade (10) according to claim 1, wherein an external layer of the laminate of the shells (13, 15) is the functional layer (31).

13. The wind turbine blade (10) according to claim 1, wherein the functional layer (31) and the reflector layer (33) are embedded into layers (30) of glass fiber composite material.

14. The wind turbine blade (10) according to claim 13, wherein the laminate of shells (13, 15) comprises an additional functional layer (31') embedded into the layers (30) of glass fiber composite material.

15. The wind turbine blade (10) according to claim 12, wherein the distance between the functional layer (31) and the reflector layer (33) is in each of the shells (13, 15) between 0.3-40 mm.

16. The wind turbine blade (10) according to claim 1 wherein the laminate of shells (13, 15) further comprises a protective coating.

17. The wind turbine blade (10) according to claim 1, wherein the reflector layer (33) of each of the shells (13, 15) comprises a metallic mesh made of one of the following materials: copper, brass, steel, and stainless steel.

* * * * *